United States Patent
Bergmann et al.

(10) Patent No.: US 9,951,657 B2
(45) Date of Patent: Apr. 24, 2018

(54) MODULE FOR CONDENSING EXPELLED VAPORS AND FOR COOLING TURBINE EFFLUENT

(71) Applicant: Siemens Aktiengesellschaft, Munich (DE)

(72) Inventors: Peter Bergmann, Gladbeck (DE); Rachid Dhima, Essen (DE); Svea Guntermann, Mülheim an der Ruhr (DE); Bernd Leu, Meerbusch (DE); Kakhi Naskidashvili, Mülheim an der Ruhr (DE); Stefan Riemann, Kaarst (DE)

(73) Assignee: Siemens Aktiengesellschaft, Munich (DE)

( * ) Notice: Subject to any disclaimer, the term of this patent is extended or adjusted under 35 U.S.C. 154(b) by 80 days.

(21) Appl. No.: 15/033,314

(22) PCT Filed: Sep. 18, 2014

(86) PCT No.: PCT/EP2014/069879
§ 371 (c)(1),
(2) Date: Apr. 29, 2016

(87) PCT Pub. No.: WO2015/067401
PCT Pub. Date: May 14, 2015

(65) Prior Publication Data
US 2016/0245124 A1    Aug. 25, 2016

(30) Foreign Application Priority Data
Nov. 8, 2013 (EP) .................................. 13192141

(51) Int. Cl.
*F24J 3/00* (2006.01)
*F01K 9/00* (2006.01)
(Continued)

(52) U.S. Cl.
CPC ................ *F01K 9/003* (2013.01); *C02F 1/00* (2013.01); *F01K 11/02* (2013.01); *F24J 3/00* (2013.01);
(Continued)

(58) Field of Classification Search
CPC .. F01K 9/003; F01K 11/02; F28B 3/00; C02F 1/00; F24J 3/02; F24J 3/00
(Continued)

(56) References Cited

U.S. PATENT DOCUMENTS

| 3,423,078 A | 1/1969 | May |
| 3,831,667 A | 8/1974 | Kilgore et al. |

(Continued)

FOREIGN PATENT DOCUMENTS

| CN | 201574787 U | 9/2010 |
| DE | 202012010335 U1 | 11/2012 |

(Continued)

OTHER PUBLICATIONS

CN Office Action dated Nov. 10, 2016, for CN patent application No. 201480061345.6.
(Continued)

*Primary Examiner* — Robert A Hopkins
(74) *Attorney, Agent, or Firm* — Beusse Wolter Sanks & Maire

(57) ABSTRACT

A module for a thermal power plant for condensing expelled vapors and cooling turbine effluent from the drained turbine includes a first unit designed to condense expelled vapors as well as a second unit designed to cool the turbine effluent, condensate from the first unit being transferable to the second unit.

16 Claims, 1 Drawing Sheet

(51) Int. Cl.
    *C02F 1/00*     (2006.01)
    *F01K 11/02*     (2006.01)
    *F28B 3/00*     (2006.01)
    *F28B 7/00*     (2006.01)
    *F28B 9/04*     (2006.01)

(52) U.S. Cl.
    CPC ................ *F28B 3/00* (2013.01); *F28B 7/00* (2013.01); *F28B 9/04* (2013.01)

(58) Field of Classification Search
    USPC ....................................................... 261/152
    See application file for complete search history.

(56) References Cited

U.S. PATENT DOCUMENTS

| | | |
|---|---|---|
| 3,881,548 A | 5/1975 | Budenholzer |
| 3,935,902 A | 2/1976 | Heller et al. |
| 2010/0132362 A1 | 6/2010 | Herbermann et al. |
| 2010/0218933 A1 | 9/2010 | Deacon et al. |
| 2012/0099974 A1 | 4/2012 | Wolf |
| 2015/0075166 A1 | 3/2015 | Minuth |

FOREIGN PATENT DOCUMENTS

| | | | |
|---|---|---|---|
| JP | 57006263 A | * | 1/1982 |
| JP | S62233405 A | | 10/1987 |
| JP | H07310987 A | | 11/1995 |
| JP | 2012097741 A | | 5/2012 |
| RU | 2047071 C1 | | 10/1995 |
| RU | 96418 U1 | | 7/2010 |
| RU | 116983 U1 | | 6/2012 |
| WO | 2007022738 A1 | | 3/2007 |
| WO | 2009100742 A3 | | 4/2012 |
| WO | 2013164197 A3 | | 6/2014 |

OTHER PUBLICATIONS

RU grant decision dated Apr. 27, 2017, for RU patent application No. 2016122529.

JP Office Action dated Sep. 4, 2017, for JP patent application No. 2016-528106.

KR Notice of Preliminary Rejection for KR patent application No. 10-2016-7014809, dated Jun. 21, 2017.

* cited by examiner

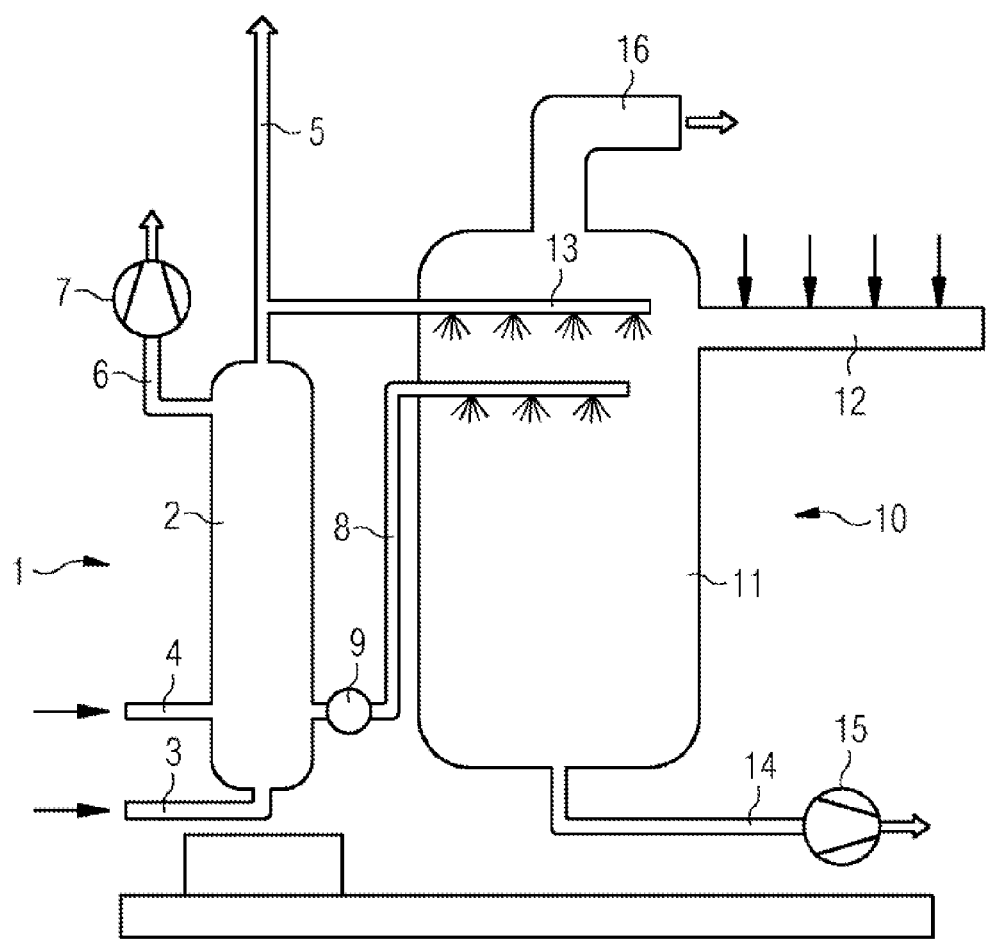

MODULE FOR CONDENSING EXPELLED VAPORS AND FOR COOLING TURBINE EFFLUENT

CROSS REFERENCE TO RELATED APPLICATIONS

This application is the U.S. National Stage of International Application No. PCT/EP2014/069879 filed Sep. 18, 2014, and claims the benefit thereof. The International Application claims the benefit of European Application No. EP13192141 filed Nov. 8, 2013. All of the applications are incorporated by reference herein in their entirety.

FIELD OF INVENTION

The present invention relates to a module for a thermal power plant for condensing expelled vapors and cooling turbine effluent from the drained turbine.

BACKGROUND OF INVENTION

Proper function of a steam turbine in a thermal power plant requires a shaft-sealed steam system and a drainage system.

The shaft-sealed steam system has the object of preventing air ingress into the steam turbine and also steam egress from the steam turbine into a power house. For that reason, air and steam are drawn out of the shaft-sealed steam system in a controlled manner. The air-steam mixture aspirated in that context, termed vapor steam, is conveyed to a vapor steam condenser. There, the steam fraction of the vapor steam condenses. The resulting condensate is conveyed to a main condenser of the thermal power plant. The air is conducted into the atmosphere. Atmosphere primarily refers to the air being discharged into a region in which approximately atmospheric pressure prevails. This can for example be a power house of the thermal power plant. In order to be able to better integrate the vapor steam condenser into a cooling circuit of the thermal power plant, the vapor steam condenser is configured for the available quantity of cooling water.

The drainage system serves for discharging water that accumulates in the steam turbine. This water still contains steam which must either be removed from the water or condensed. At this point, it should be noted that, in the context of this application and unless otherwise stated, water is to be understood as liquid water and steam as water steam.

SUMMARY OF INVENTION

An object of the invention is to provide a simplified construction for the above-mentioned requirements, namely turbine drainage and vapor steam condensation.

This object is achieved with the features of the independent claim. Dependent claims indicate advantageous developments. To achieve the object, there is proposed a module for a thermal power plant for condensing vapor steam and for cooling turbine waste water from turbine drainage. Such a module, which performs both functions, makes it possible to reduce the complexity of construction. As described in the introduction, it is common in the prior art to configure the vapor steam condenser for the available quantity of water in the cooling circuit. This generally results in the vapor steam condenser being oversized. A common module for condensing vapor steam and for cooling the turbine waste water makes it possible to remove this drawback. It is expedient in this context that condensate obtained by condensing vapor steam can be used for cooling the turbine waste water. It is thus possible to provide cooling water only for condensing vapor steam. Additional provision of cooling water for cooling the turbine waste water becomes unnecessary.

For conversion, a first unit of the module is designed to condense the vapor steam and a second unit is designed to cool the turbine waste water, wherein condensate produced in the first unit can be passed to the second unit. It is expedient in that context that, in the first unit, the condensing of the vapor steam can take place essentially without taking into account the cooling of the turbine waste water. By virtue of the possibility of passing the produced condensate to the second unit, in which the cooling of the turbine waste water takes place, it is possible to realize a synergistic effect between the two units. In particular, for the proper understanding of the following explanations, it should be stated that the second unit generally has an upper and a lower region.

In one embodiment of the module, a condensate line serves to pass condensate from the first unit to the second unit, wherein in particular a steam trap is present in the condensate line. This permits proper transfer of the condensate.

In one embodiment of the module, cooling water, in particular cooling water which is provided for standpipes of a main condenser of the thermal power plant, can flow through the first unit. In that context, the main condenser is to be understood as that condenser in which is condensed the steam flowing out of the steam turbine, more precisely out of that part of the steam turbine which is flowed through last. The obtained condensate is used as feed water which is to be heated and evaporated again.

In one embodiment of the module, cooling water can be used in the second unit after flowing through the first unit, in particular for injection into the second unit. In that context, injection is advantageously carried out in an upper region of the second unit. Insofar as has been stated above that no additional cooling water need be provided for cooling of the turbine waste water, in the case of this embodiment the statement should be clarified to the effect that cooling water which has already been used for condensing vapor steam can be used once again for cooling the turbine waste water.

In one embodiment of the module, there is present, in the first unit, an outlet through which air, carried with the vapor steam into the first unit, can be discharged, in particular to the atmosphere, after condensation of the vapor steam. The vapor steam contains a considerable quantity of air. While the contained steam can be condensed and the condensate can for example be reused as feed water, the air must be removed. In that context, the air is advantageously discharged into the atmosphere. As stated in the introduction, this means for example venting the air into the power house. The outlet in the first unit is normally installed in an upper region of the first unit.

In one embodiment of the module, the second unit has an inlet for turbine waste water which is in particular connected in the upper region of the second unit. This allows the turbine waste water which is to be cooled to flow from top to bottom through the second unit, and to be cooled in the process.

In one embodiment of the module, the second unit has an outlet to the main condenser, wherein the outlet is in particular connected in a lower region of the second unit. This allows the cooled turbine waste water, in which the entrained steam has been condensed by means of the cooling, to pass to the main condenser. In addition to the turbine waste water, it may also be possible for introduced condensate from the first unit and introduced cooling water to be discharged at the same time. The main condenser generally has a collecting box whence condensed steam can be supplied to the boiler feed water by means of main condensate pumps. Consequently, the turbine waste water can advantageously be conveyed into the collecting box and thence supplied to the boiler feed water. In order to convey the turbine waste water to the main condenser, that is to say generally into the collecting box, it is frequently expedient to provide a pump. This makes it possible, where necessary, for the outlet to the main condenser to lie geodetically below the main condenser. A pump can also serve for controlled discharge of the cooled turbine waste water.

In one embodiment of the module, there is a connection line, serving for pressure equalization, between the second unit and the main condenser, wherein the connection line is in particular connected in the upper region of the second unit. This can make it possible for the same pressure to prevail in the second unit and in the main condenser.

BRIEF DESCRIPTION OF THE DRAWINGS

The invention will be described in greater detail below with reference to a FIGURE.

The sole FIGURE shows, schematically, a module according to aspects of the invention.

DETAILED DESCRIPTION OF INVENTION

The FIGURE shows a first unit 1 which comprises a heat exchanger 2 for condensing vapor steam. Cooling water is conveyed through a cooling water supply line 3 into the first unit 1, more precisely into the heat exchanger 2, for condensing vapor steam. The vapor steam is supplied via a vapor steam supply line 4. The vapor steam is cooled by the exchange of heat in the heat exchanger 2. This initiates condensation. The heat released during cooling of the vapor steam and above all during condensation is transferred to the cooling water. The cooling water flows through a cooling water discharge line 5 to a standpipe. Air contained in the vapor steam is drawn off through an air discharge line 6 serving as an outlet and is conveyed into a machine space of the thermal power plant. A fan 7, which is arranged in the air discharge line 6, serves for drawing-off.

The condensate produced in the first unit 1 is conveyed, via a condensate line 8 and with the aid of a steam trap 9 installed in the condensate line 8, into a second unit 10. The second unit 10 comprises, in essence, a drainage tank 11. In that context, the condensate line 8 opens into an upper region of the second unit 10. Opposite this in the second unit, there is arranged a turbine waste water supply line 12 as inlet for the turbine waste water. The turbine waste water supply line 12 conveys, into the drainage tank 11, turbine waste water which, as indicated by the arrows, originates in turbines of the thermal power plant. In the drainage tank 11, the turbine waste water flows downward.

Part of the cooling water flowing out of the first unit 1 through the cooling water discharge line 5 is diverted and flows through a cooling water injection line 13, whence it is injected into the upper region of the drainage tank 11. The injected cooling water and the injected condensate cool the introduced turbine waste water in the drainage tank 11. This condenses the steam which is entrained by the turbine waste water and is at first still contained in the turbine waste water. The turbine waste water which is largely freed from steam, the injected cooling water and the introduced condensate collect in a lower region of the drainage tank 11. Thence, it is conveyed through a condensate discharge line 14 serving as outlet, with the aid of a pump 15 contained in the condensate discharge line 14, into a main condenser (not shown) of the thermal power plant. A pressure-equalizing line 16, arranged at the top of the drainage tank 11, is also connected to the main condenser and serves for pressure equalization between the drainage tank 11 and the main condenser, such that the drainage tank 11 is at the pressure of the main condenser.

In a conventional thermal power plant producing several hundred megawatts, a power of at most 600 kW is sufficient for the heat exchanger 2 in the above-described module. A temperature difference of 10 K is sufficient. No more than 15 kg/s of cooling water are required.

Although the invention has been described and illustrated in more detail by way of the preferred exemplary embodiment, the invention is not restricted by the disclosed examples and other variations can be derived herefrom by a person skilled in the art without departing from the scope of protection of the invention.

The invention claimed is:

1. A module for a thermal power plant for condensing vapor steam and for cooling turbine waste water from turbine drainage, comprising:
   a first unit which is designed to condense the vapor steam,
   a second unit which is designed to cool the turbine waste water, and
   cooling water that flows through the first unit,
   wherein condensate produced in the first unit is passed to the second unit, and
   wherein the cooling water is used in the second unit after flowing through the first unit.
2. The module as claimed in claim 1, further comprising:
   a condensate line which serves to pass condensate from the first unit to the second unit.
3. The module as claimed in claim 1, further comprising:
   in the first unit, an outlet through which air, carried with the vapor steam into the first unit, is discharged after condensation of the vapor steam.
4. The module as claimed in claim 1,
   wherein the second unit has an inlet for the turbine waste water.
5. The module as claimed in claim 1,
   wherein the second unit has an outlet to a main condenser.
6. The module as claimed in claim 1, further comprising:
   a connection line, serving for pressure equalization, between the second unit and a main condenser.
7. The module as claimed in claim 2, further comprising:
   a steam trap in the condensate line.
8. The module as claimed in claim 1,
   wherein the cooling water comprises cooling water which is provided for standpipes of a main condenser of the thermal power plant.
9. The module as claimed in claim 1,
   wherein the cooling water is injected into the second unit.
10. The module as claimed in claim 3,
    wherein the air is discharged the atmosphere after condensation of the vapor steam.
11. The module as claimed in claim 4,
    wherein the inlet for the turbine waste water is connected in an upper region of the second unit.
12. The module as claimed in claim 5,
    wherein the outlet to the main condenser is connected in a lower region of the second unit.

13. The module as claimed in claim 6,
wherein the connection line is connected in an upper region of the second unit.

14. A module for a thermal power plant for condensing vapor steam and for cooling turbine waste water from turbine drainage, comprising:
- a first unit which is designed to condense the vapor steam,
- a second unit which is designed to cool the turbine waste water, wherein condensate produced in the first unit is passed to the second unit, and
- an outlet in the first unit through which air, carried with the vapor steam into the first unit, is discharged after condensation of the vapor steam.

15. The module as claimed in claim 14,
wherein the air is discharged the atmosphere after condensation of the vapor steam.

16. A module for a thermal power plant for condensing vapor steam and for cooling turbine waste water from turbine drainage, comprising:
- a first unit which is designed to condense the vapor steam,
- a second unit which is designed to cool the turbine waste water, wherein condensate produced in the first unit is passed to the second unit,
- a condensate line which serves to pass condensate from the first unit to the second unit, and
- a steam trap in the condensate line.

* * * * *